CARL H. HEVERT
WALTER J. KRUPICK
PAUL E. SEIFRIED
*INVENTORS*

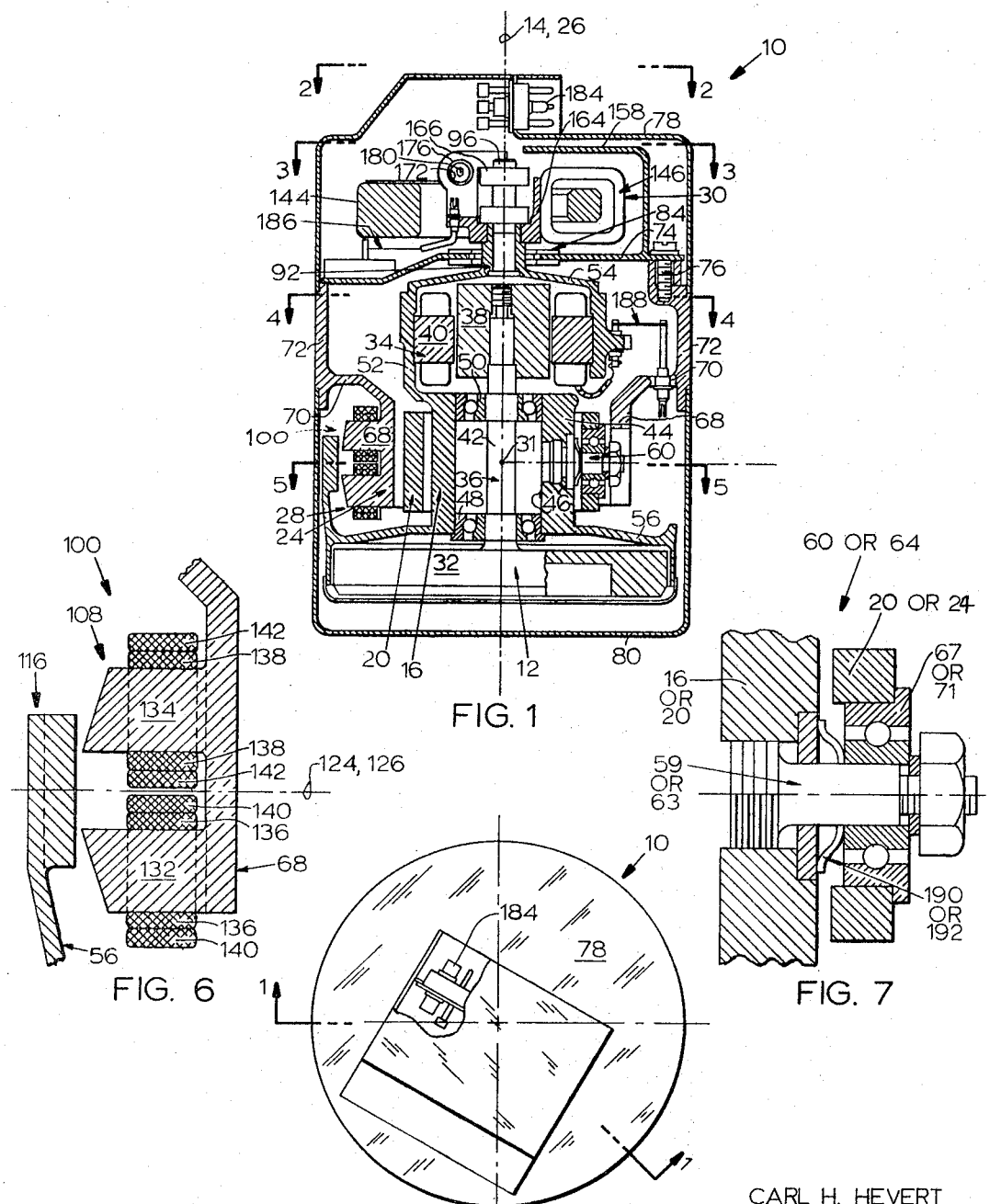

BY

*Thomas W. Kennedy*
ATTORNEY

United States Patent Office 3,323,375
Patented June 6, 1967

3,323,375
TWO-AXIS GYRO
Carl H. Hevert, Wayne, and Walter J. Krupick, Succasunna, N.J., and Paul E. Seifried, New City, N.Y., assignors to General Precision Inc., Little Falls, N.J., a corporation of Delaware
Filed Dec. 28, 1964, Ser. No. 421,373
8 Claims. (Cl. 74—5)

The present invention relates to gyroscopes, and particularly to a two-axis displacement gyro, which has a small-size gimbal system supporting a large-size rotor unit.

A prior-art two-axis displacement gyro for use as an inertial reference device has a rotor unit pivotally supported by a gimbal system.

One problem with such a prior-art gyro is the slight drift error due to the presence of slight pivot frictions, which are caused by pivot loads from the mass and weight of the gimbal system itself.

Another problem with such a prior-art gyro is the slight drift error due to the slight deflections in the compliant and elastic gimbal system caused by vibration loads, acceleration loads and thermal loads.

In accordance with one embodiment of the present invention, the weight and compliance of said gimbal system relative to that of its rotor unit is substantially minimized by using a differently shaped rotor unit, having a shaft with a motor and flywheel coaxially mounted on opposite ends of said shaft, and by using a gimbal system arranged around said shaft and disposed between the flywheel and the motor.

Accordingly, it is one object of the present invention to provide a two-axis gyro in which the friction drift error is minimized.

It is another object of the invention to provide a two-axis gyro in which the size of its gimbal system relative to its rotor unit is minimized.

It is a further object of the present invention to provide a two-axis gyro according to the aforementioned objects in which the compliance of the gimbal-supported pickoff apparatus is minimized.

It is a still further object of the present invention to provide a two-axis gyro according to the aforementioned objects, which has a single-magnet torquer.

To the fulfillment of these and other objects the invention provides a two-axis gyro comprising a rotor unit having a shaft with a spin axis and having a flywheel and a motor axially spaced along such spin axis and mounted on opposite ends of said shaft. Said gyro also comprises a gimbal system, which supports said rotor unit for providing a universal movement of said rotor unit, relative thereto, and which is disposed in a peripheral direction around said shaft and which is disposed in an axial direction between said flywheel and said motor for minimizing the size and weight of the supporting gimbal system relative to the size and weight of the supported rotor unit.

Other objects of the invention will become apparent upon reading the annexed detailed description in connection with the drawings wherein like parts are designated by like numerals throughout the several views and wherein:

FIG. 1 is a sectional view of a two-axis gyro embodying features of the present invention;

FIG. 2 is a sectional view taken along line 2—2 of FIG. 1;

FIG. 6 is an enlarged view of a portion of FIG. 1;

FIG. 7 is an enlarged view of another portion of FIG. 1; and

Figure 3:
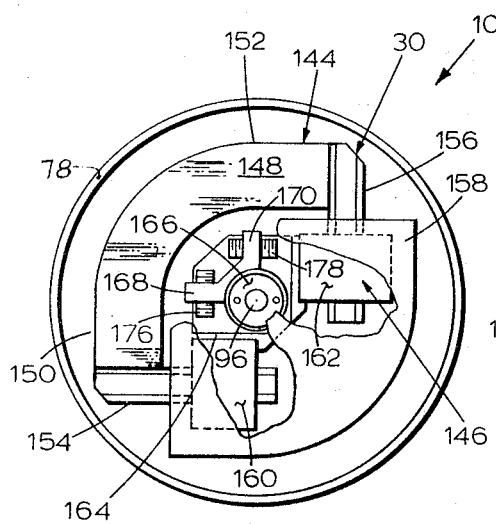
FIG. 3 is a sectional view taken along line 3—3 of FIG. 1.
Figure 5:
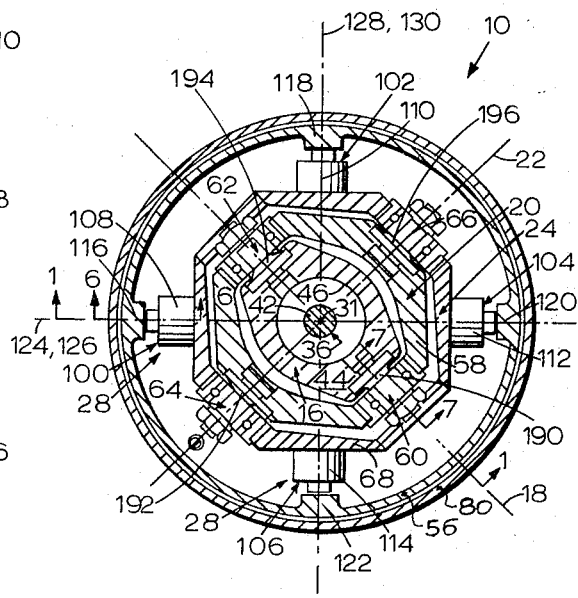
FIG. 5 is a sectional view taken along line 5—5 of FIG. 1.
Figure 4:
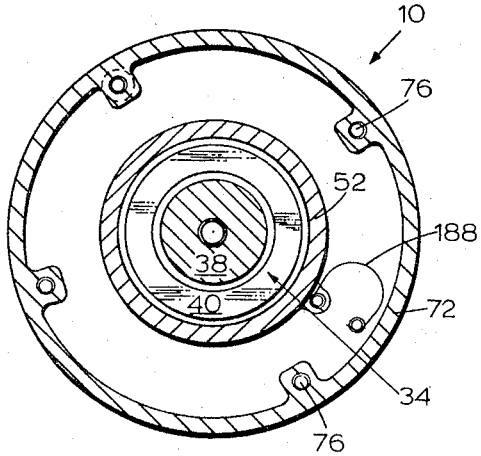
FIG. 4 is a sectional view taken along line 4—4 of FIG. 1.
Figure 8:
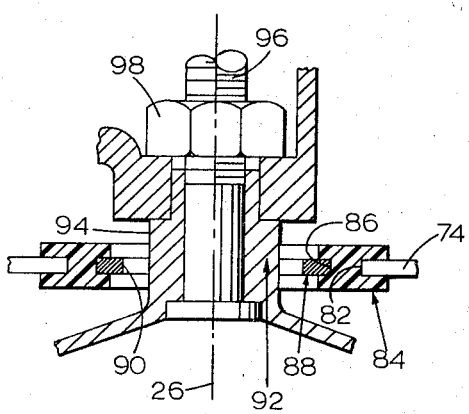
FIG. 8 is an enlarged view of still another portion of FIG. 1.

Referring to FIGS. 1 through 8, inclusive, one embodiment 10 of the present invention, which is a two-degree-of-freedom displacement gyro, comprises a rotor unit 12 with a spin axis 14, a first gimbal or radially innermost gimbal 16 having a first pivot axis 18 for supporting rotor unit 12 for rotation of rotor unit 12 relative to first gimbal 16, a second gimbal or adjoining outer gimbal 20 having a second pivot axis 22 supporting gimbal 16 relative to gimbal 20 about axis 22, and a third gimbal or support housing 24 which is preferably stationary and has a fixed vertical reference axis 26 for pivotally supporting gimbal 20 relative to gimbal 24 about axis 22. Gyro 10 also has a pickoff apparatus 28 coaxially mounted on first gimbal 16 with portions cooperating with gimbal 24; and also has a torquer apparatus 30 also coaxially mounted on gimbal 16 with portions cooperating with gimbal 24. Axes 14, 18, 22 and 26 preferably intersect at a common point of intersection 31 about which rotor unit 12 has a universal movement. Axes 18 and 22 are substantially coplanar in all angles of tilt of rotor unit 12. With this type of gyro 10, it is intended that pickoff 28 and torquer 30 maintain spin axis 14 in alignment with reference axis 26.

Rotor unit 12 (FIG. 1) is comprised of a flywheel or rotor 32 of enlarged diameter concentrically disposed about axis 14, a motor 34 axially-spaced from said flywheel 32 coaxially therewith along axis 14, and a supporting shaft 36 disposed between flywheel 32 and motor 34. Rotor unit 12 is a rotor-shaft-motor structure having a dumbbell-shape in perspective view and an H-shape in cross-section view. Motor 34 has a motor hysteresis ring or inner portion 38 mounted on the end of shaft 36; and has a motor stator-lamination or outer portion 40 supported on gimbal 16. Shaft 36 has a center portion 42 rotatably supported by gimbal 16.

Gimbal 16 (FIGS. 1, 5) has a peripheral wall or bore portion 44, which is disposed between flywheel 32 and motor 34. Wall 44 has a radially inner surface 46, which is preferably a cylindrical surface with an axis of curvature coinciding with axis 14 and which is journaled on shaft portion 42. Wall 44 supports ball bearings 48, 50 disposed between surface 46 and the outer surface of shaft portion 42, and also disposed on either side of intersection point 31.

Gimbal 16 supports an integral flange portion 52 (FIGS. 1, 4) which is preferably cylindrical in shape and which is coaxial with wall 44 and which also extends axially outwardly from an upper end of said wall 44. Flange 52 connects to and supports motor outer portion 40. Flange 52 also has an end wall 54 on its axially outer side.

Gimbal 16 also has a shield member 56 surrounding flywheel 32. Shield 56 is preferably a cylindrical disc of thin-wall construction with a cavity receiving flywheel 32, but separated therefrom by sufficient clearance. Shield 56 assures that windage torque from flywheel 32 is applied on its support gimbal 16 rather than on adjacent gimbal 20 in order to minimize slight drift errors caused by differential torques between gimbal 16 and 20.

Gimbal 20 (FIGS. 1, 5) has a peripheral wall 58 in the shape of an octagonal ring. Wall 58 has a first pair of axially-spaced pivots 60, 62, coaxial along axis 18, and extending in a radially inward direction from wall 58 for support of gimbal 16 by gimbal 20. Wall 58 also has a second pair of axially-spaced pivots 64, 66, coaxial along axis 22 and extending in a radially outward direction from wall 58 for support of gimbal 20 on gimbal 24.

Pivots 60, 62 (FIGS. 5, 7) have respective cantilevering pins 59, 61 mounted in gimbal 16 with respective ball bearings 67, 69 mounted in gimbal 20; and pivots 64, 66 similarly have respective pins 63, 65 mounted in gimbal 20 with respective ball bearings 71, 73 mounted in gimbal 24.

Gimbal 24 (FIGS. 1, 5) has a peripheral wall 68, which is also in the shape of an octagonal ring and which supports pivots 64, 66. Wall 68 has a washer-shaped wall portion 70 extending outwardly therefrom in a radial direction for mounting gimbal 24. Washer portion 70 supports a cylindrical flange 72 at its radially outer edge. Flange 72, which has an enlarged diameter relative to that of wall 68 is also disposed radially outwardly of motor 34.

Flange 72 (FIGS. 1, 4) supports an end plate 74, which is disposed axially outwardly of motor 34, and also disposed axially inwardly of torquer 30. Wall plate 74 is removably connected to the axially outer edge of flange 72 by bolts 76, or the like. Flange 72 supports an upper cover or cap 78 for enclosing torquer 30; and wall 70 supports a lower cover or cap 80 for enclosing flywheel 32.

End plate 74 (FIG. 8), has a radially inner edge 82 of circular shape. Edge 82 is covered by a bumper or grommet 84, which is composed preferably of elastomeric material, or the like. Bumper 84 has a radially-inwardly-facing circular groove 86 disposed in its inner surface, which receives a relatively-thin, circularly-shaped insert-washer 88 with an inner surface 90 concentric about axis 26. End wall 54 has a projecting stop bar 92 integral therewith and extending in an axially outward direction therefrom and having a cylindrical outer surface 94 concentric about spin axis 14. Inner surface 90 engages outer surface 94 when spin axis 14 is tilted to a maximum design angle relative to axis 26 thereby providing a constant-angle tilt stop. Stop bar 92 also has a cantilevering stud bolt 96 and adjacent nut 98 affixed thereto, coaxial therewith along axis 14 and extending in an axially outward direction therefrom for supporting torquer 30.

Pickoff apparatus 28 (FIGS. 1, 5, 6), which senses a tilt angle between axis 14 and axis 26, includes pickoff units 100, 102, 104, 106 of identical construction, that are disposed in a peripheral direction around wall 68 and are also disposed in an axial direction between flywheel 32 and motor 34. Pickoffs 100, 102, 104, 106, respectively, have radially inner portions or iron cores 108, 110, 112, 114, which are mounted on a radially outer side of gimbal 24, equi-distant from and equi-spaced about axis 26; and said pickoffs 100, 102, 104, 106, respectively, have radially outer portions or iron vanes 116, 118, 120, 122, which are respectively disposed adjacent to said cores and mounted on shield 56 equi-distant from and equi-spaced about axis 14.

Cores 108, 112 (FIG. 5) preferably have a common axis 124 and adjacent vanes 116, 120 have a common axis 126. Axes 124 and 126 are substantially coincident at a gyro null condition. Similarly, cores 110, 114 preferably have a common axis 128; and adjacent vanes 118, 122 have a common axis 130. Axes 128 and 130 are also substantially coincident at a gyro null condition. Axes 124, 128 are substantially at right angles to axis 26; and axes 126, 130 are substantially at right angles to axis 14. In addition, axes 124, 126, 128 and 130 preferably extend through intersection point 31. With this preferred arrangement of pickoff units of 100, 102, 104, 106, the components of displacement of vanes 116, 118, 120, 122 relative to respective cores 108, 110, 112, 114 are substantially minimized in a radial direction relative to the components of said displacement acting in an axially-parallel direction. Such arrangement improves the sensitivity of said pickoffs 100, 102, 104, 106. In addition, with such arrangement, the weight and compliance of the gimbal-supported pickoff apparatus is also minimized.

Core 108 (FIG. 6), which is identical to core 110, 112, 114, is described in detail hereafter. Core 108 has a pair of legs or pole pieces 132, 134 disposed equi-distant from and parallel to its axis 124. Legs 132, 134 have respective primary coils 136, 138 which are wrapped thereon, and have respective secondary coils 140, 142 which are respectively wrapped around primary coils 136, 138. With such construction, an excitation of primary coils 136, 138 generates output voltages in secondary coils 140, 142. Coils 140, 142 and their diametrically-opposite secondary coils in core 112 are connected so that said output voltages measure only rotation and not translation. In this way, drift errors caused by translations due to acceleration loads are minimized. Moreover, since cores 108, 110, 112, 114 are mounted on fixed gimbal 24, the need for pickoff flexleads is also eliminated.

Torquer 30 (FIGS. 1, 3), which is disposed in an axial direction between end plate 74 and upper cap 78, includes a magnet assembly 144 that is fixedly connected to wall 68 coaxial along axis 26, and a coil assembly 146 that is fixedly connected to wall 54 coaxial along axis 14 for aligning axis 14 with axis 26.

Magnet assembly 144 (FIG. 3) has a magnet 148 of elongate quadrant-shape with two legs 150, 152, which are equi-distant from axis 26 and which are disposed in a plane substantially at right angles to axis 26. Legs 150, 152 have a pair of pole pieces 154, 156, which are preferably composed of magnetic ingot-iron and which are respectively connected to the ends of said legs 150, 152 substantially at right angles thereto. Magnet assembly 144 also has a magnet shield 158 of elongate quadrant-shape, which is connected to wall 68 and which forms a U-shaped return path therewith for magnetic flux flow.

Coil assembly 146 has a pair of torquing coils 160, 162 of rectangular profile and ring shape, which respectively cooperate with pole pieces 154, 156. Coils 160, 162 have a support bracket 164, which is fixedly connected to wall 54. Coils 160, 162, which have respective coil windings (not shown), respectively surround pole pieces 154, 156 and have clearance therefrom. Coils 160, 162 exert torque forces directed at substantially right angles to each other. Said forces are equi-distant from axis 14 and are disposed in a plane substantially at right angles to axis 14. Bracket 164, which is fixedly connected to bore 92 by bolt 96 and nut 98 supports coil assembly 146 and gimbal 16 coaxially therewith.

Stud bolt 96 (FIGS. 1, 3) has a balancing nut 166 disposed axially outwardly of nut 98 for balancing gimbal 16 about intersection point 31. Bracket 164 has a pair of wall portions 168, 170 extending in an axially outwardly direction therefrom and having respectively a pair of tapped holes 172, 174 with a respective pair of balancing screws 176, 178 fitted therein. Screws 176, 178 have respective axes 180, 182, which are disposed in a plane substantially at right angles to axis 14 and disposed substantially at right angles to each other. With this construction, the theoretical center of gravity of rotor unit 12, gimbal 16, and gimbal 20, and those portions supported from said gimbals 16, 20, can be shifted to substantially coincide with intersection point 31, and thereby minimize drift errors caused by gyro out-of-balance.

Gyro 10 (FIG. 1) is supplied with electrical power through a terminal connector 184, which is mounted on upper cap 78. Power is distributed therefrom through upper flexleads 186 to torquer coil assembly 146, and through lower flexleads 188 to motor stator 40, and through wire tapes (not shown) to pickoff apparatus 28.

Pivots 60, 64 (FIGS. 1, 5, 7) also have respective Belleville springs 190, 192 (FIG. 7), which are disposed respectively between gimbals 16 and 20, and between gimbals 20 and 24. Pivots 62, 66 have respective washer stacks 194, 196 similarly disposed diametrically opposite springs 190, 192 so that gimbal 16, and also gimbal 20, can be slightly displaced in a radial direction relative to gimbal 24 whereby axes 14 and 26 can be aligned for ease of calibration and assembly of gyro 10, and so that bearings 67, 69, 71, 73 can be pre-loaded.

In summary, a two-axis gyro is provided in which the weight and size of the supporting gimbal system relative to the weight and size of the supported rotor unit is substantially minimized. In addition, a two-axis gyro is provided in which the weight and compliance of the gimbal-supported pickoff apparatus is substantially minimized.

While the present invention has been described in a preferred embodiment, it will be obvious to those skilled in the art that various modifications can be made therein within the scope of the invention, and it is intended that the appended claims cover all such modifications.

What is claimed is:

1. A two-axis gyro comprising:
   a rotor unit having a shaft with a spin axis and having a flywheel and a motor axially-spaced along said spin axis and mounted on opposite ends of said shaft; and
   a gimbal system supporting said rotor unit for providing universal movement of said rotor unit relative thereto and disposed in a peripheral direction around said shaft and disposed in an axial direction between said flywheel and said motor for minimizing the size and weight of the gimbal system relative to the size and weight of the rotor unit.

2. A gyro as claimed in claim 1, in which said gimbal system includes:
   a first gimbal for supporting the shaft for rotation of said rotor unit relative to said first gimbal;
   a second gimbal having a first pivot axis disposed substantially at right angles to said spin axis at a point of intersection therewith with a first pair of pivots facing radially inwardly for supporting said first gimbal therefrom, and having a second pivot axis disposed substantially at right angles to said first pivot axis at said point of intersection with a second pair of pivots facing radially outwardly; and
   a third gimbal connecting to said second pair of pivots for supporting said second gimbal and having a reference axis intersecting said spin axis at said point of intersection.

3. A gyro as claimed in claim 2, and including:
   a plurality of pickoff units disposed in a peripheral direction around said shaft and disposed in an axial direction between said flywheel and said motor and respectively having radially inner portions mounted on said third gimbal and having radially outer portions mounted on said first gimbal thereby sensing the tilt of said spin axis relative to said reference axis.

4. A gyro as claimed in claim 3, in which:
   said pickoff inner bodies have respective radial axes substantially intersecting said reference axis at said point of intersection and being disposed in a plane substantially at right angles to said reference axis, and
   said pickoff outer bodies have respective radial axes substantially intersecting said spin axis at said point of intersection and being disposed in a plane substantially at right angles to said spin axis to thereby minimize the radial components of the displacements of said outer bodies relative to their respective inner bodies.

5. A gyro as claimed in claim 4, and in which:
   each said pickoff inner body has a pair of legs disposed parallel to and equi-distant from its radial axis with each leg respectively having a primary coil wrapped thereon and having a secondary wrapped over said primary coil, and
   each adjacent outer body is a vane arranged symmetrically about its radial axis for movement relative to said inner body either side of a null gyro position at which their axes are substantially coincident.

6. A gyro as claimed in claim 3, and including a two-axis single-magnet torquer unit with cooperating portions mounting on said first gimbal and said third gimbal and disposed axially outwardly of said rotor unit for cooperation with said pickoff units for torquing in any direction and for aligning said spin axis with said reference axis.

7. A gyro as claimed in claim 6, in which said torquer includes:
   an L-shaped elongate permanent magnet mounted on said third gimbal,
   a pair of elongate pole pieces respectively mounted on each end of said magnet with respective axes disposed substantially at right angles to each other and disposed in a plane substantially at right angles to said reference axis, and
   a pair of coil rings respectively surrounding said pole pieces with clearance therefrom with respective axes disposed substantially at right angles to each other and disposed within a plane substantially at right angles to said spin axis.

8. A gyro as claimed in claim 3, and including a tilt-stop device comprising:
   an inner body with an axis and a cylindrical outer surface concentric thereabout and coaxially mounted on said first gimbal, and
   an outer body with an axis and a cylindrical inner surface concentric thereabout coaxially mounted on said third gimbal and surrounding said inner body for movement in a radial direction relative thereto, for providing a constant-angle stop in any direction of tilt.

References Cited
UNITED STATES PATENTS

| | | | |
|---|---|---|---|
| 1,578,833 | 3/1926 | Kogler | 64—18 |
| 2,641,134 | 6/1953 | Kenyon | 74—5.7 X |
| 3,225,609 | 12/1965 | Stiles | 74—5.7 |

FRED C. MATTERN, Jr., *Primary Examiner.*

J. D. PUFFER, *Assistant Examiner.*